United States Patent [19]

Keidl et al.

[11] 4,424,539

[45] Jan. 3, 1984

[54] MAGNETIC DISK-CONTROL TRACK READ THROUGH ENVELOPE

[75] Inventors: Steven D. Keidl; Karl A. Shidler, both of Rochester, Minn.

[73] Assignee: International Business Machines Corporation, Armonk, N.Y.

[21] Appl. No.: 333,837

[22] Filed: Dec. 23, 1981

[51] Int. Cl.³ .................... G11B 5/012; G11B 5/82
[52] U.S. Cl. .................................... 360/69; 360/133
[58] Field of Search .................. 360/69, 71, 72.2, 73, 360/74.4, 75, 133

[56] References Cited

PUBLICATIONS

IBM Technical Disclosure Bulletin, vol. 23 No. 9, Feb. 1981, pp. 4032–4033, Diskette Marking, Fletcher et al.

*Primary Examiner*—George G. Stellar
*Attorney, Agent, or Firm*—Carl W. Laumann, Jr.

[57] ABSTRACT

Control information for a flexible magnetic disk storage assembly is recorded on the periphery of the disk in a region not used for recording data. The control information is read through the protective cover or envelope which encloses the disk by means of a magnetic transducer such as a four track audio cassette head which bears against the envelope. By recording index and sector pulses as part of the control information, hard sectoring can be inexpensively and accurately achieved. A recorded fixed frequency control signal can be read and used as part of the feedback loop in a phase locked oscillator used to control a d.c. motor driving the spindle. The control information can also include servo tracks which assist in registering the data transducer directly over data tracks on media which has changed its dimensions.

29 Claims, 7 Drawing Figures

MAGNETIC DISK-CONTROL TRACK READ THROUGH ENVELOPE

TECHNICAL FIELD

This invention relates to data storage systems of the flexible disk type in which the disk is enclosed in a protective carrier such as a plastic envelope. Such disk assemblies have come to be commonly known as diskettes. The invention is particularly directed to the means for developing the control signals associated with such systems. For example, an index signal is commonly required to provide reference information on the angular position of the disk. Additionally, in systems where d.c. motors are used to drive the disk, it is necessary to generate a signal which accurately represents the angular velocity of the disk. This signal is used to regulate the speed of rotation.

Other signals are also useful. Some systems divide disks into sectors and it is desirable to have a signal pulse at the beginning of each sector. As systems become more advanced and data density increases it is likely that even more control signals will be desirable. Signals such as the track servo signals used on high density hard disk files may very well become essential to overcome the eccentricity and ellipticity which are common to flexible media. Servo codes exist which can be recorded to provide compensating signals to a head positioning servo system.

BACKGROUND ART

In the most common flexible file systems, the spindle is driven by an a.c. motor which provides a relatively constant speed at the required torque. While such systems function satisfactorily from the standpoint of current technology, they are relatively expensive and do not lend themselves well to future generation devices. Such motors tend to be larger than desired and dissipate substantial heat. These are undesirable characteristics when the trend is toward smaller equipment. Small, efficient d.c. motors have existed for some time but the complexity of the mechanism for developing a velocity feedback signal has inhibited their application to this problem in all but the least critical areas.

Disks for use on flexible file systems usually incorporate an index hole which coacts with a light source and optical sensor to provide an index pulse each time the disk revolves. This technique has been adequate but imposes constraints on the substrate media which must be opaque at the wavelength of the light source. The hole sensing technique has limited resolving power and is therefore not likely to meet the needs of future, high density systems.

Future flexible file systems are likely to employ hard sectoring, a technique widely used in high density hard files. This requires the generation of a pulse which accurately defines the starting point for writing and reading data records. A typical sectoring application would require 26 sector pulses for each revolution of the disk. Optical sensing of holes in the disk is unacceptable for this purpose. While hard disk files commonly use a dedicated head for reading sector information, the typical flexible file has only a limited number of data tracks and cannot accommodate an additional, fixed, read head without loss of a substantial portion of an already limited number of tracks. The cost of an additional head is also a factor. Thus, hard sectoring, while it has many advantages, has not been widely applied to flexible file storage systems.

Another factor which has limited the advances in flexible file technology is the instability of the media. The tendency of the plastic substrate to change dimensions in response to humidity and temperature has prevented adoption of track densities which would otherwise be posible. While techniques for overcoming eccentricity and ellipticity are in existence they commonly require a dedicated read head. This has not been acceptable in the past because it would result in the loss of substantial data capacity and an increase in cost which is not matched by increased performance.

DISCLOSURE OF THE INVENTION

The principal object of the invention is to provide a high performance flexible disk file storage system in which certain of the electrical, mechanical or optical means for generating control signals are replaced by a single magnetic transducer which is located in a region away from the data transducer and which reads from the storage track containing control information through the flexible rectangular envelope surrounding the flexible disk. That is to say, instead of placing the magnetic head in contact with the disk, as is done for data, the head is simply brought to bear against the outer surface of the protective envelope. Despite the fact that the head is spaced from the media by the thickness of the envelope and whatever air gap exists between the media and the inner surface of the envelope, an adequate signal is obtained. There is ample bandwidth to record all the types of control signals that have been discussed. Since it is most convenient to develop a single control signal from each track, one, two or four track recording heads may be used.

A conventional single track head may be used for a one track system in which a single control signal is required, for example a sector pulse. A two track cassette or ¼" tape type head may be used where two control signals are needed and a four track cassette or ¼" tape type head may be used where three or four control signals are required.

A single control signal will commonly be the index pulse which is almost universally used to locate a reference point on the flexible disk. An optical index pulse system might also use a single control signal to provide the rotational velocity/position feedback signal required in systems which use a d.c. motor to drive the spindle. Systems which use two control signals would probably develop an index pulse and a velocity/position feedback signal. Four control signals would add hard sectoring and media compensation.

BEST MODE FOR CARRYING OUT THE INVENTION

The invention can be practiced on a flexible disk (diskette) drive system of the type shown in U.S. Pat. No. 4,193,102 to W. E. Beuch et al issued Mar. 11, 1980 using a flexible disk of the general form shown in U.S. Pat. No. 3,879,757 to J. F. Elliott issued Apr. 22, 1975.

Figure 1:
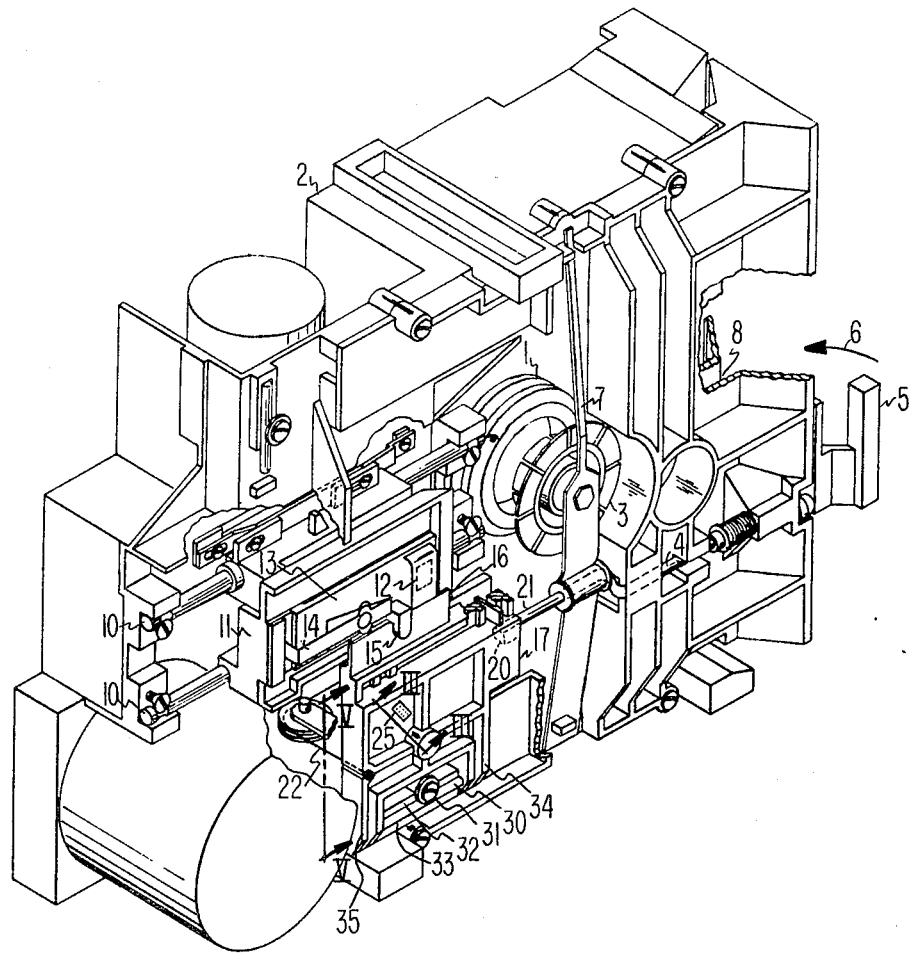
FIG. 1 is an isometric view of a flexible disk storage system showing the principal mechanical components of the system and the location of the magnetic head which reads the control information.

The drive system shown in FIG. 1 includes a spindle having a rotatable machine hub 1 fixed to a shaft, not shown, supported by a bearing in base casting member 2. Opposite hub 1 is an expandable collet 3 which passes through a first center, aperture in the disk carrier to center the disk and hold it against the drive hub. The collet 3 is moved into engagement with hub 1 by means of an eccentric arm 4 having a handle 5 which can be rotated, in the direction of arrow 6 causing collet spring 7 to press collet 3 into the hub 1 which serves to center and clamp the disk which was previously inserted through slot 8.

A pair of support rods 10, fixed to the base member 2, slidably support transducer carriage 11. A first transducer 12 is mounted on swing arm 13 having a leaf return spring 14 which biases the swing arm toward the disk to bring transducer 12 into engagement with the disk surface through a second aperture in the disk carrier. The second aperture is in the shape of a slot through both surfaces of the disk carrier in a direction perpendicular to one edge of the disk carrier. Hook 15 on swing arm 13 overlies a flange portion 16 of bail 17. An end cavity 20 accommodates the offset terminal portion 21 of eccentric arm 4 so that rotation of the arm in the direction of arrow 6 frees the bail to allow movement toward the disk. Actual movement of bail 17 toward the disk is caused by energizing a solenoid connected to cable 22.

When the bail 17 moves toward the disk in response to energization of the solenoid, corresponding movement of flange 16 allows swing arm 13 to move toward the disk in response to the force exerted by leaf spring 14. Movement of bail 17 toward the disk brings second transducer 25 to bear against the envelope (disk carrier) which encloses and protects the flexible magnetic disk.

Figures 2, 6:
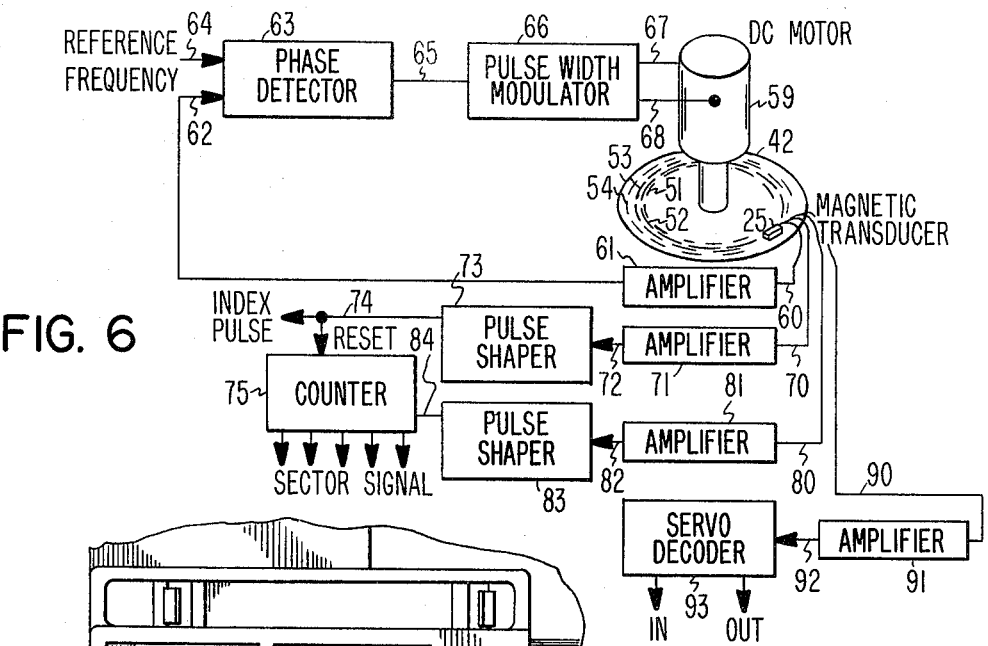
FIG. 2 is an enlarged plan view of the bail portion of the system showing the location of the magnetic head on the bail.
FIG. 6 is a schematic drawing of the electronic control system used to develop the index pulse, the spindle drive motor control signal, the sector pulse and an eccentricity and ellipticity control signal.

With reference to FIG. 2, second transducer 25 is positioned at a location on bail 17 so that it bears against the disk envelope at a point near the edge of the diskette. The transducer may be mounted in bail 17 by any suitable means such as epoxy glue. Also shown is pivot rod 30 affixed to base member 2 by means of mounting screw 31 which clamps it into a slot formed by rails 32 and 33. Bail 17 has a pair of holes in arm portions 34 and 35 which accommodate pivot rod 30 and allow for rotation of bail 17.

Figure 3:
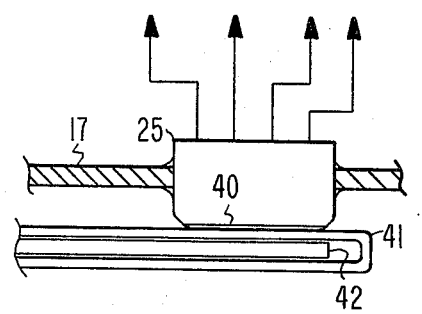
FIG. 3 is a schematic sectional view taken along the line III—III which shows the location of the magnetic head, the envelope and the flexible disk within the envelope.

The arrangement of the second transducer 25 relative to the envelope and the disk is shown in FIG. 3. Transducer 25 is mounted in bail 17 with the surface 40 containing the magnetic heads in engagement with the outer surface of disk envelope 41. Flexible disk 42 rotates within the envelope and is free to move back and forth within the envelope as the disk rotates. Even though the disk position varies the head to media spacing the signal developed by the head is more than adequate for the desired purpose.

Figure 4A:
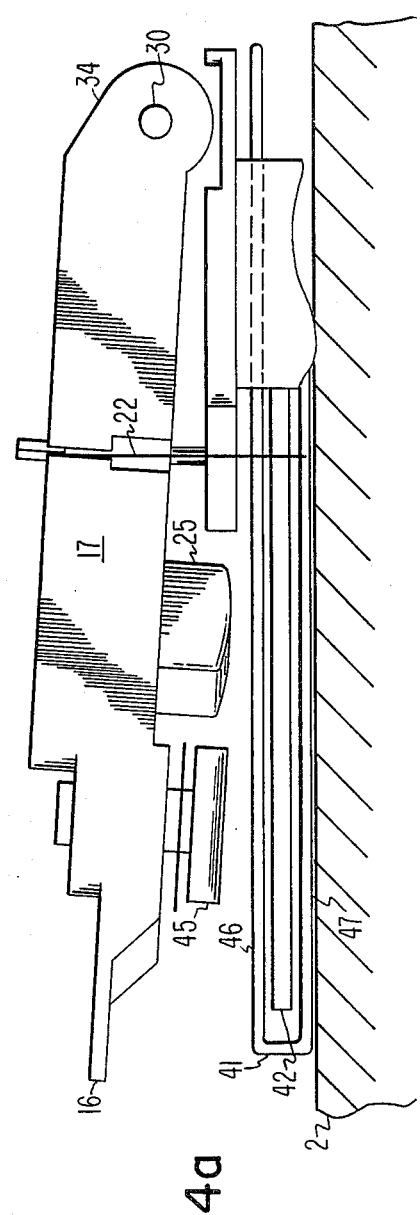
FIGS. 4a and 4b are partial sectional views of the bail mechanism in the operative and retracted positions.
Figure 4B:
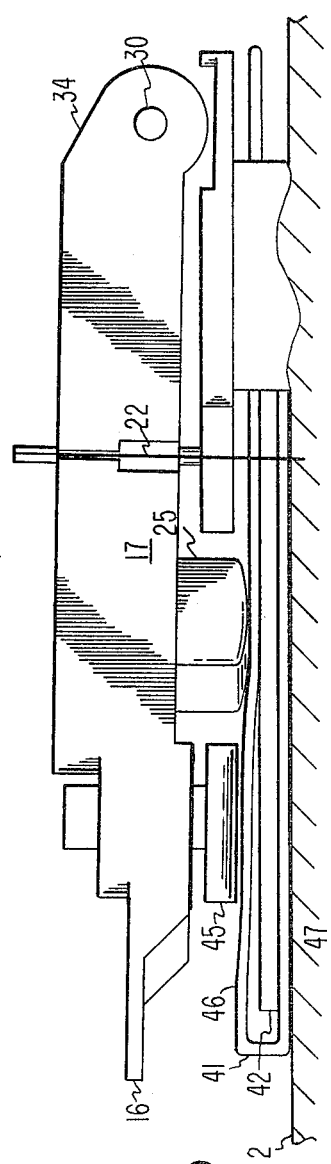

FIGS. 4a and 4b show the bail in the retracted and operating position. In the retracted position shown in FIG. 4a, bail 17 has rotated on pivot pin 30 so that second transducer 25 and pressure plate 45 are spaced away from envelope 41 and flexible disk 42. Since no compressive force is applied to envelope 41, the sides 46 and 47 remain sprung apart and flexible disk 42 lies at some position inbetween. When the bail actuating solenoid is energized it causes cable 22 to rotate bail 17 toward base member 2. This causes pressure pad 45 to bear on envelope 41 and compress it against base member 2 as shown in FIG. 4b. Transducer 25 bears lightly on the envelope 41 in the operating position. It does not add significant drag to disk 42.

Figure 5:
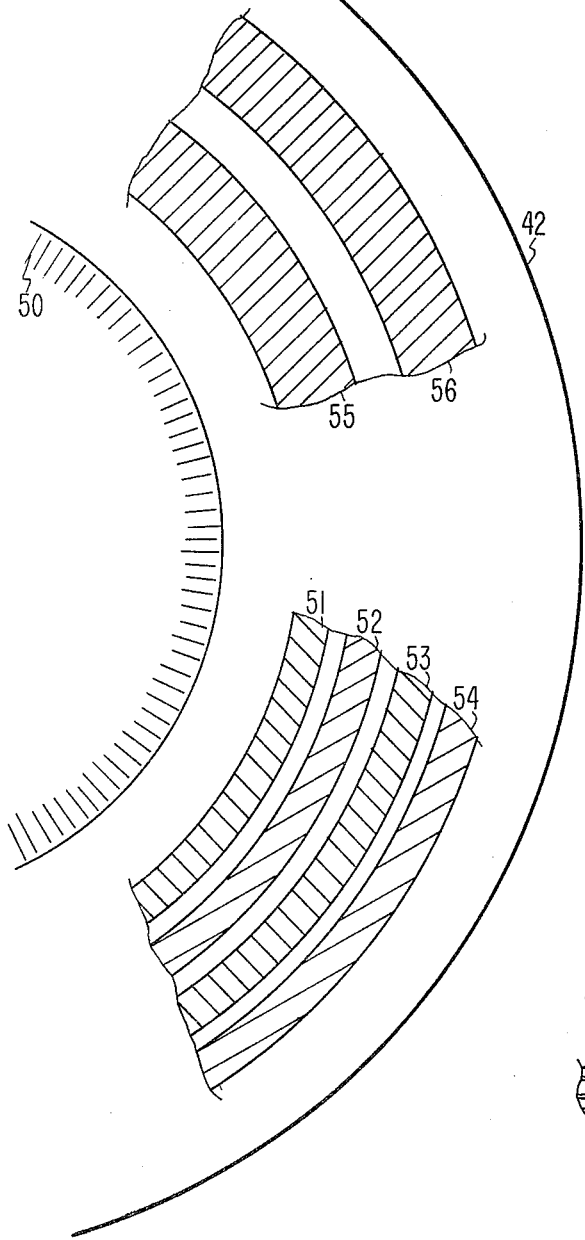
FIG. 5 shows the physical arrangement of the control tracks on the flexible disk.

FIG. 5 shows, in schematic form, the arrangement of the magnetic tracks on the disk. The normal data tracks 50 lie toward the interior portion of the disk 42. Control tracks 51, 52, 53 and 54 are positioned near the edge of the disk in a region which does not normally contain recorded information. The spacing of the tracks is made to correspond to the geometry of the well known two or four gap heads commonly used to record and reproduce audio on cassettes or ¼" magnetic tape. The tracks containing control information will normally be located toward the outer portion of the disk in a region which is not accessible through the second aperture used by first transducer 12.

Where it is not necessary to have four tracks for control information, the arrangement of tracks 55 and 56 may be used. The spacing of a two track configuration is the preferable mode to correspond to the track spacing of the well known audio cassette to allow a conventional two gap audio head to be used.

In the case of four control tracks, the usual control functions will include; index pulse—track 51, sector signals—track 52, velocity feedback—track 53 and media alignment signal—track 54. Systems limited to just two signals would have any two of the above as needed.

It will be appreciated that the two track and four track illustrations are mutually exclusive. The tracks extend completely about the disk and are shown in partial form to illustrate both embodiments.

FIG. 6 shows the electronic control system which is driven by the various control signals. The second magnetic transducer 25 reads the control information in the form of signals recorded on the outer portion of disk 42 which is driven by d.c. electric motor 59. The velocity control track 53 is read by transducer 25, which may be a four head audio read head, to develop a variable frequency signal on line 60 where the frequency varies as a direct function of the rotational velocity. First circuit means, including amplifier 61, apply this signal to first input 62 of phase detector 63. The other signal to phase detector 63 comes from a reference frequency source and is applied to second input 64. The output on line signal 65 from phase detector 63 is applied to pulse width modulator 66 which has output terminals 67 and 68 connected to d.c. motor 60. The phase detector and pulse width modulator function as a speed control means to regulate the speed of d.c. motor 59 to a value determined by the reference frequency. Such control circuitry is well known.

A second control track 51 contains the control signal which indicates a predetermined angular position of the disk to the using system. The output on line 70 from the head which reads this track is fed to second circuit means including amplifier 71 which connects to the index pulse control signal generating means, pulse shaper 73. The amplified output on line 72 is fed to the input of pulse shaper 73 which serves to generate the index pulse control signal to the using system on line 74. The index pulse is also used to reset the counter 75 used to develop the sector signal.

A third control track provides a signal used to develop a hard sector signal. The output on line 80 from the head associated with the sector track 52 is supplied to third circuit means, including amplifier 81. The amplified output on line 82 is fed to the input of pulse shaper 83 and then over line 84 to the input of counter 75 which serves as a control signal generating means. The sector signal outputs of counter 75 represent the number of the sector which is currently under the first transducer. Counter 75 is reset to zero by the index pulse on line 74.

A fourth control track under transducer 25 develops a signal on line 90 from the head associated with track 54 to provide a signal used to correct for physical distortion of the diskette. The track is recorded with any satisfactory servo pattern which develops a distinctive output as the track to head alignment changes. Such patterns are well known and often applied to hard disk systems having high track density. Fourth circuit means, including amplifier 91, connect the signal on line 90 to the input of decoder 93 on line 92. The track servo control signal is generated in decoder 93 which analyzes the signal derived from the control information on the disk to provide corrective signals indicating the amount of movement required to bring the first transducer to the center of the desired track.

The track width and the spacing between tracks will depend on the geometry of transducer 25. If standard audio heads are used the track width is preferably the same as the distance between tracks.

We claim:

1. In a magnetic disk assembly including a flexible disk having a magnetic recording coating on at least one surface thereof and positioned within a disk carrier having an aperture therein for permitting a magnetic transducer to coact with said coating, the improvement comprising:
   at least one magnetic storage track at a location which is not accessible through said aperture,
   said storage track containing control information readable through said carrier.

2. A device according to claim 1 wherein, said disc carrier is a flexible, rectangular envelope having walls of substantially uniform thickness.

3. A device according to claim 2 wherein, said aperture is a slot through both surfaces of said envelope positioned radially in a direction perpendicular to one edge of said rectangular envelope.

4. A device according to claim 3 wherein, said magnetic storage track not accessible through said aperture is located a radial distance from the center of said disk which is greater than the radial distance to the outmost end of said aperture.

5. A device according to claim 4 wherein, said control information includes a plurality of pulses which provide an indication of rotational velocity when read.

6. A device according to claim 4 wherein, said control information contains an index signal.

7. A device according to claim 4 wherein, said control information includes a plurality of sector locating pulses.

8. A device according to claim 4 wherein, said control information includes track servo information.

9. In a magnetic disk drive system for use with a flexible disk positioned within a carrier, a disk drive device for rotation of said disk within said carrier, first transducer means for coaction with said disk through an aperture in said carrier, to read and/or write data to or from said disk, the improvement comprising:
   second transducer means positioned to read control information from said disk through the wall of said carrier.

10. A device according to claim 9 wherein
    said disk drive device includes an electric motor,
    speed control means for said electric motor, and
    first circuit means connecting said second transducer to said speed control means to regulate the rotational velocity of said disk drive device.

11. A device according to claim 9 wherein
    said disk drive device includes control signal generating means for developing an index signal indicating a predetermined angular position of an associated flexible disk, and
    second circuit means connecting said second transducer to said control signal generating means to develop said index signal in response to control information recorded on an associated disk.

12. A device according to claim 9 wherein,
    said disk drive device includes control signal generating means for developing a sector signal indicating the sector positioned under said first transducer, and
    third circuit means connecting said second transducer to said control signal generating means to develop said sector signal in response to control information recorded on said disk.

13. A device according to claim 9 wherein,
    said disk drive device includes control signal generating means for developing a track servo signal indicating the relative displacement of said second transducer from a track, and
    fourth circuit means connecting said second transducer to said control signal generating means to develop said track servo signal in response to control information recorded on said disk.

14. A device according to claim 10 wherein,
    said disk drive device includes control signal generating means for developing an index signal indicating a predetermined angular position of an associated flexible disk, and
    second circuit means connecting said second transducer to said control signal generating means to develop said index signal in response to control information recorded on said disk.

15. A device according to claim 10 wherein,
    said disk drive device includes control signal generating means for developing a sector signal indicating the sector positioned under said first transducer, and
    third circuit means connecting said second transducer to said control signal generating means to develop said sector signal in response to control information recorded on said disk.

16. In combination, a magnetic disk drive system and a magnetic disk assembly,
    said magnetic disk assembly comprising;

a flexible disk having a magnetic recording coating on at least one surface thereof to accommodate a plurality of data recording tracks and a control track, a disk carrier enclosing said disk, a first aperture in said enclosure to accommodate engagement with a drive means, a second aperture in said enclosure to permit a magnetic transducer to coact with said coating in the region of said data recording tracks, and said magnetic disk drive system comprising;

a disk drive device for rotating said disk within said carrier, first transducer means for coaction with said disk through said second aperture in the region of said data recording tracks, and second transducer means for coaction with said disk through said carrier in the region of said control track.

17. The combination of claim 16 wherein, said disk carrier is a flexible rectangular envelope having walls of substantially uniform thickness.

18. The combination of claim 17 wherein, said first aperture is a circular hole centered in said envelope and said second aperture is a slot through both surfaces of said envelope positioned radially in a direction perpendicular to one edge of said envelope.

19. The combination of claim 18 wherein, said control track is located a radial distance from the center of said disk which is greater than the radial distance to the outmost end of said second aperture.

20. The combination of claim 19 wherein said control track contains a recorded signal which provides an indication of rotational velocity when read.

21. The combination of claim 19 wherein, said control track contains a recorded index signal.

22. The combination of claim 19 wherein said control track contains a recorded signal which provides an indication of the sector under said first transducer means when read.

23. The combination of claim 19 wherein, said control track contains recorded track servo signals to provide an indication of the displacement of said second transducer from said control track when read.

24. The combination of claim 16 wherein, said disk drive device includes an electric motor, speed control means for said electric motor, and first circuit means connecting said second transducer to said speed control means to regulate the rotational velocity of said disk in response to the output signal from said second transducer developed from the control track.

25. The combination of claim 16 wherein, said disk drive device includes control signal generating means for developing an index signal indicating a predetermined angular position of an associated flexible disk, and second circuit means connecting said second transducer to said control signal generating means to develop said index signal in response to a control signal recorded on said control track.

26. The combination of claim 16 wherein, said disk drive device includes control signal generating means for developing a sector signal indicating the sector positioned under said first transducer, and third circuit means connecting said second transducer to said control signal generating means to develop said sector signal in response to control information recorded on said disk.

27. The combination of claim 16 wherein, said disk drive device includes control signal generating means for developing a track servo signal indicating the relative displacement of said second transducer from a track, and fourth circuit means connecting said second transducer to said control signal generating means to develop said track servo signal in response to control information recorded on said disk.

28. The combination of claim 24 further including control signal generating means for developing an index signal indicating a predetermined angular position of an associated flexible disk, and second circuit means connecting said second transducer to said control signal generating means to develop said index signal in response to a control signal recorded on said control track.

29. The combination of claim 24 further including control signal generating means for developing a sector signal indicating the sector positioned under said first transducer, and third circuit means connecting said second transducer to said control signal generating means to develop said sector signal in response to control information recorded on said disk.

* * * * *